Jan. 23, 1934.   S. M. COFFMAN   1,944,220
FREEWHEELING TRANSMISSION MECHANISM
Filed April 20, 1931   2 Sheets-Sheet 1
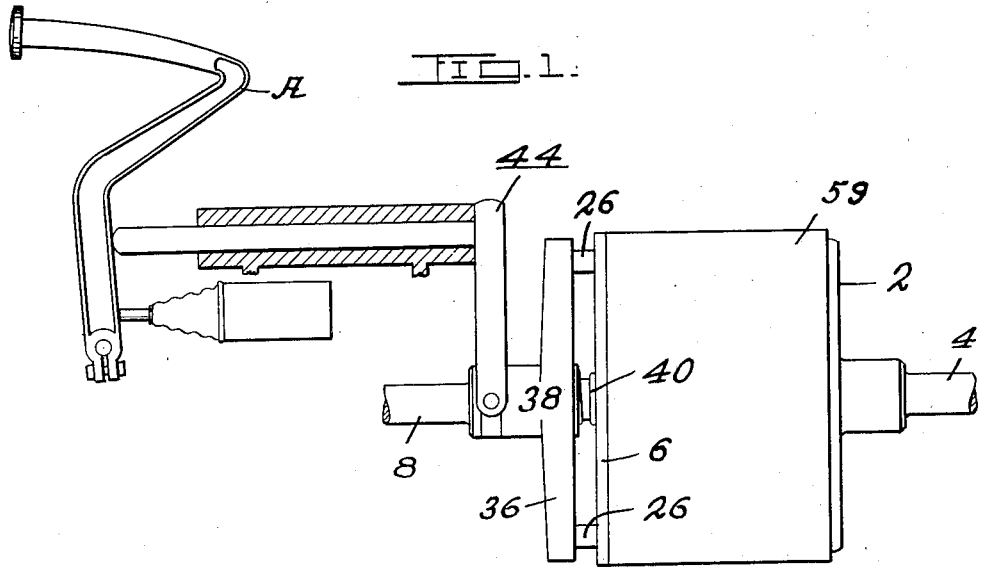
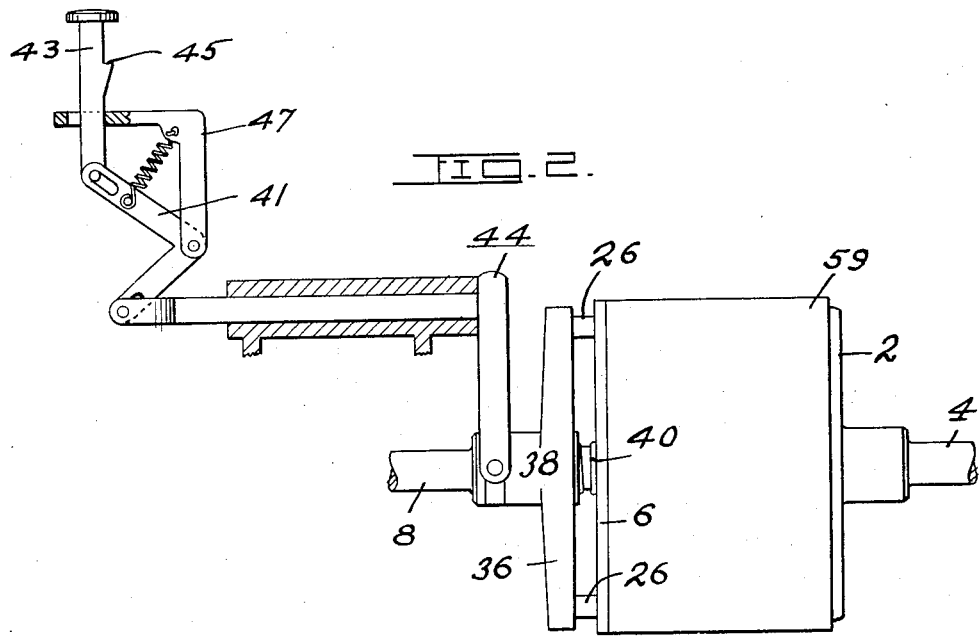
INVENTOR:
Samuel M. Coffman,
BY
F. G. Fischer,
ATTORNEY.

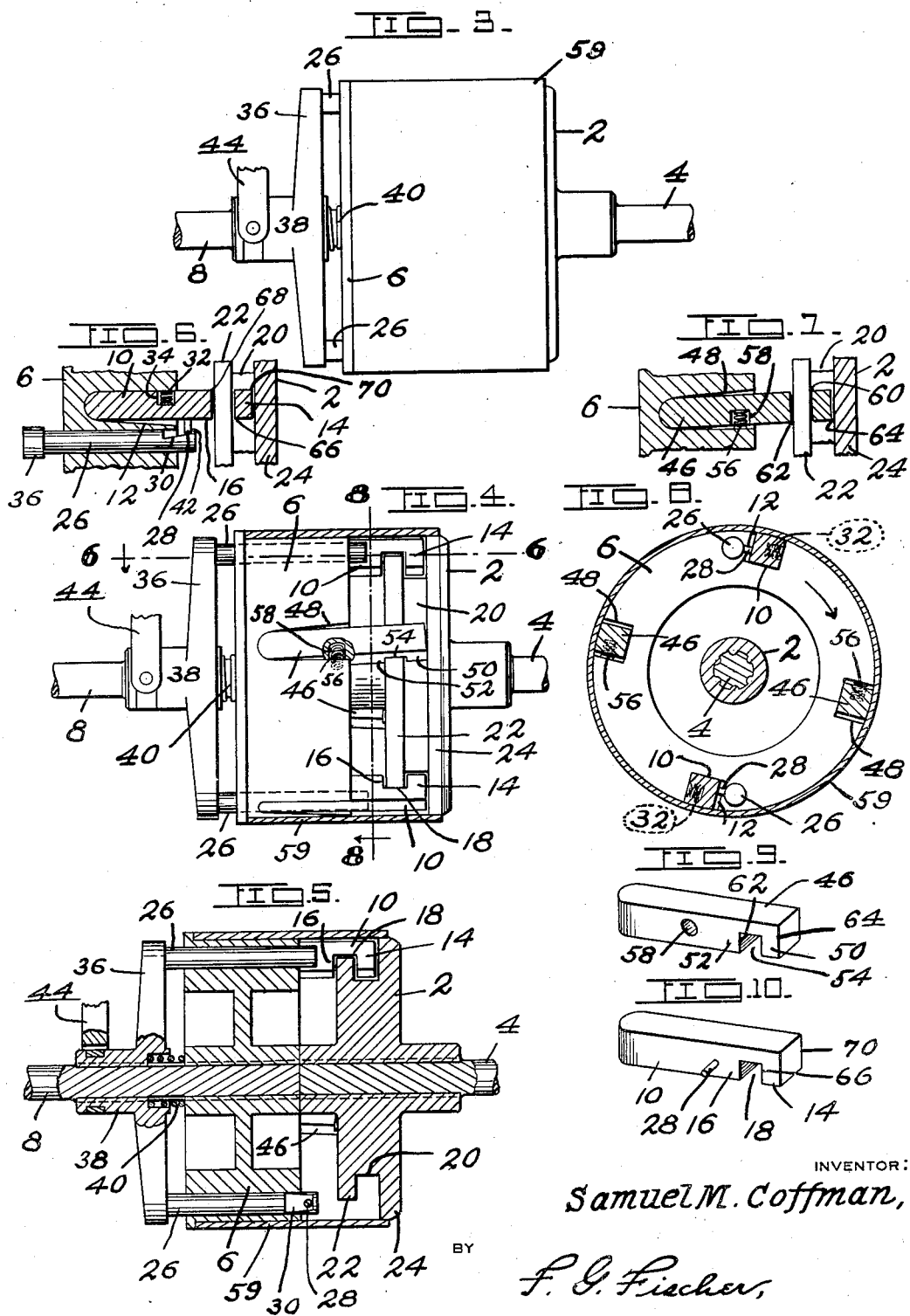

Patented Jan. 23, 1934

1,944,220

UNITED STATES PATENT OFFICE 1,944,220

FREEWHEELING TRANSMISSION MECHANISM

Samuel M. Coffman, Kansas City, Mo.

Application April 20, 1931. Serial No. 531,330

8 Claims. (Cl. 192—48)

My invention relates to free wheeling transmission mechanisms and while it is applicable to a variety of machines, it is especially useful on automotive vehicles where all of the advantages of a device of this character may be had by letting the vehicle coast.

One object of the invention is the production of a novel power transmission device of simple, strong and durable construction, which is positive and reliable in operation and free from back-lash and lost motion.

A further object is to equip a device of this character with means under the control of the driver for locking the driving and driven members of the device together, so that the braking power of the engine may be utilized in reducing the speed or in stopping the vehicle whenever desired.

Other objects will hereinafter appear and in order that the invention may be fully understood reference will now be had to the accompanying drawings, in which:—

Fig. 1 is a side elevation of the device associated with the brake lever of the vehicle so that when the brake is applied the driving and driven members of the device will be locked together and utilize the braking power of the engine in checking the vehicle.

Fig. 2 is a similar view to Fig. 1, excepting that a pedal is substituted for the brake lever.

Fig. 3 is a detail side elevation of the device.

Fig. 4 is a view similar to Fig. 3, excepting that the housing is in section to disclose the internal working parts.

Fig. 5 is a vertical sectional view of the device.

Fig. 6 is a fragmentary sectional view showing certain features of the device, on line 6—6 of Fig. 4.

Fig. 7 is a fragmentary section showing other features of the device.

Fig. 8 is a cross section on line 8—8 of Fig. 4.

Fig. 9 is a detail perspective view of one of a plurality of clutch elements employed in carrying out the invention.

Fig. 10 is a detail perspective view of another clutch element.

Referrring in detail to the different parts, 2 designates a driving member fixedly mounted upon a shaft 4 which may be the engine shaft when the device is used on an automotive vehicle. 6 designates a driven member arranged in axial alinement with the driving member 2 and fixedly mounted upon a shaft 8 which may be coupled to the propeller or other suitable shaft of the vehicle.

10 designates a pair of clutch elements operably mounted at their rear ends in diametrically opposed recesses 12 formed in the driven member 6. The clutch elements 10 project from the recesses 12 and are provided at their forward ends with fixed jaws 14 and 16 spaced at opposite sides of grooves 18 formed in said clutch elements. The jaws 14 project into an annular groove 20 formed between circular flanges 22 and 24 extending around the driving member 2 with which they are preferably formed integral as shown more clearly by Fig. 5.

The clutch elements 10 are normally held inactive and in parallelism with the axis of the device as more clearly shown on Figs. 5 and 6 by a pair of arms 26 and studs 28, which latter are held in engagement with oblique face portions 30 of said arms 26 by resilient means such as coil springs 32 mounted in cavities 34 formed in the respective clutch elements and pressing against the adjacent faces of the recesses 12.

The arms 26 are slidably mounted in the driven member 6 and form part of a yoke 36 provided with a centrally disposed hub 38 which is splined upon the shaft 8 in order that it may slide longitudinally thereon and at the same time be driven thereby. The yoke 36 is normally held in retracted position by resilient means such as a coil spring 40 which encircles the shaft 8 and is interposed between the driven member 6 and the hub 38 as best shown by Fig. 5. The backward movement of the yoke 36 is limited by the studs 28 and lips 42, which latter are formed at the forward ends of the oblique face portions 30, as best shown by Fig. 6.

Any suitable means may be provided for advancing the yoke 36 against the action of the spring 40. In the present instance I have shown such means in the form of a shifting member 44 operably connected at its forward end to the hub 38. On Fig. 1 of the drawings I have shown the rear end of the member 44 arranged in the path of the vehicle brake lever A to be actuated thereby, and on Fig. 2 the member 44 connected to a bell-crank 41 controlled by a pedal 43 having a shoulder 45 adapted to engage the under surface of a supporting member 47 which may be secured to the transmission case (not shown) or any suitable part of the vehicle.

46 designates a second pair of clutch elements which are similar to the clutch elements 10, excepting that they have no studs 28. The clutch element 46 are mounted in diametrically opposed recesses 48 formed in the driven member 6 at a point about midway between the recesses 12. The clutch elements 46 are provided at their forward ends with fixed jaws 50 and 52 formed at opposite sides of a groove 54 through which the flange 22 extends. Springs 56 bearing against the adjacent sides of the recesses 48 and located in cavities 58 in the clutch elements 46 yieldably hold the latter in active position. The clutch elements 10 and 46 are held in their recesses 12 and 48 by a housing 59 embracing the driving and driven members 2 and 6, respectively, and suitably secured to said driven member 6.

In practice the clutch elements 46 are held slightly out of parallelism with the axis of the driving and driven members 2 and 6 by means of the springs 56 so that the corners 60 and 62 of the jaws 50 and 52, respectively, will engage the opposite sides of the flange 22 while the corner 64 of the jaw 50 engages the adjacent side of the flange 24 in such manner as to cause the driving member 2 to rotate the driven member 6 in one direction and permit the latter member to overrun the former member whenever the speed of the driven member 6 exceeds the speed of the driving member 2. When this occurs the jaw 50 will slide on the flanges 22 and 24 and the jaw 52 will slide on the flange 22 and thus permit the vehicle to coast until the driven member 6 slows down to the speed of the driving member 2, whereupon the clutch elements 46 are ready without back-lash or lost motion, to transmit motion from the driving member 2 to the driven member 6. The foregoing operations take place automatically and without any attention on the part of the driver.

When it becomes desirable to lock the driving member 2 and the driven member 6 together so that the braking power of the engine may be utilized in retarding the speed or stopping the vehicle, the clutch elements 10, which are normally held inactive and parallel with the axis of rotation of the device through the intermediary of the studs 28 and arms 26, Fig. 6, are released by advancing the arms 26 through the intermediary of either of the manually controlled means shown on Figs. 1 and 2. The springs 32 then instantly adjust the clutch elements 10 to an oblique angle extending in an opposite direction to the angle of the clutch elements 46 and cause the corners 66 and 68 of the jaws 14 and 16, respectively, to grip opposite sides of the flange 22 and the corner 70 of the jaw 14 to grip the adjacent side of the flange 24. The clutch elements 10 and 46 then cooperate in locking the driving and driven members 2 and 6 together so that they will operate as one unit at all speeds until the arms 26 are retracted to their former position, whereupon the oblique faces 30 acting upon the respective studs 28 restore the clutch elements 10 to a parallel position with the axis of rotation and against a wall of the respective recesses 12, as disclosed by Fig. 6. When the mechanism shown by Fig. 2 is employed the driving and driven members 2 and 6 may be held in locked position as long as desired and without further attention on the part of the driver after the shoulder 45 on the pedal 43 has been engaged with the underside of the supporting member 47.

When installed on an automotive vehicle the device is preferably located within the transmission case where it will be well lubricated and protected from dust and other foreign matter, or if found desirable it may be located at such other point in the transmission line as would meet with the approval of those skilled in the art.

From the foregoing description taken in connection with the drawings it will be apparent that I have provided a power transmission mechanism which is well adapted for the purpose intended, and while I have shown and described the preferred embodiment of the invention I reserve all rights to such other forms and modifications thereof as properly fall within the spirit and scope of the invention as claimed.

Having thus described my invention, what I claim and desire to secure by Letters Patent, is:

1. A power transmission mechanism comprising a rotary driving member, a rotary driven member, a clutch element through which said driving member transmits motion to the driven member and permits over-run of the latter member in one direction, spring means for holding said clutch element in active position, a second clutch element for coacting with the first-mentioned clutch element in locking the driving and driven members together so they will travel in unison at all speeds, manually controlled mechanism including an arm slidably mounted in one of the rotary members for holding said second clutch element in inactive position, and spring means for adjusting said second clutch element to active position.

2. A power transmission mechanism consisting of rotary driving and driven members, an element carried by one of said members and adapted to automatically grip the other member and transmit motion from the driving member to the driven member and permit the latter to attain a higher speed than the former, a second element for coacting with the first element in locking the driving and driven members together so they will travel as one unit at all speeds, a yoke having an arm slidably mounted in one of said members and provided with an angular face for adjusting said second element to inactive position, and suitable means for actuating said yoke.

3. A power transmission mechanism consisting of rotary driving and driven members, elements carried by one of said members and adapted to automatically grip the other member and transmit motion from the driving member to the driven member and permit the latter to attain a higher speed than the former, a second set of elements for coacting with the first elements in locking the driving and driven members together so they will travel as one unit at all speeds, a yoke having arms slidably mounted in one of said members and provided with angular faces for adjusting said second set of elements to inactive position, resilient means for holding said yoke in active position, and manually controlled means for adjusting said yoke to inactive position.

4. A power transmission mechanism consisting of rotary driving and driven members, elements carried by one of said members and adapted to automatically grip the other member and transmit motion from the driving member to the driven member and permit the latter to attain a higher speed than the former, a second set of elements for coacting with the first elements in locking the driving and driven members together so they will travel as one unit at all speeds, a yoke having arms slidably mounted in one of said members and provided with angular faces for adjusting said second set of elements to inactive position, resilient means for holding said yoke in active position, foot controlled means for adjusting said yoke to inactive position, and means cooperating with said foot controlled means for securing the yoke in inactive position.

5. A transmission mechanism comprising driving and driven members arranged in axial alinement, circular flanges spaced apart upon one of said members, a clutch element operably mounted within a recess in the other member, a housing embracing the driving and driven members and adapted to hold said clutch element in the recess, a jaw on said clutch element and projecting between and adapted to engage said flanges to transmit motion from the driving to the driven member and permit over-run of the latter member in one direction, and means for holding said jaw in engagement with said flanges.

6. A transmission mechanism comprising driving and driven members arranged in axial alinement, circular flanges spaced apart upon one of said members, a plurality of clutch elements operably mounted on the other member, a jaw on each clutch element projecting between and adapted to engage said flanges to transmit motion from the driving to the driven member and permit over-run of the latter member in one direction, resilient means for holding said jaws in engagement with said flanges, a second clutch element operably mounted in the same member as the first clutch member, a jaw on said second clutch member projecting between and adapted to engage said flanges to prevent over-run of the driven member, resilient means for throwing said last-mentioned jaw in engagement with the flanges, and manually controlled means for throwing said last-mentioned jaw out of engagement with the flanges.

7. A transmission mechanism comprising driving and driven members, circular flanges spaced apart upon one of said members, a clutch element operably mounted upon the other member, a jaw on said clutch element projecting between and adapted to engage said flanges to transmit motion from the driving to the driven member and permit over-run of the latter member in one direction, another jaw on said clutch element adapted to engage the opposite side of one of the flanges, and means for holding said jaws in engagement with the flanges.

8. A transmission mechanism comprising driving and driven members, circular flanges spaced apart upon one of said members, a clutch element operably mounted upon the other member, a jaw on said clutch element projecting between and adapted to engage said flanges to transmit motion from the driving to the driven member and permit over-run of the latter member in one direction, another jaw on said clutch element adapted to engage the opposite side of one of the flanges, means for holding said jaws in engagement with the flanges, a second clutch element operably mounted in one of the rotary members, a jaw on said second clutch member projecting between said flanges, resilient means for throwing said last-mentioned jaw into engagement with the flanges to prevent over-run of the driven member, and manually controlled means for throwing said last-mentioned jaw out of engagement with the flanges.

SAMUEL M. COFFMAN.